Figure 1:
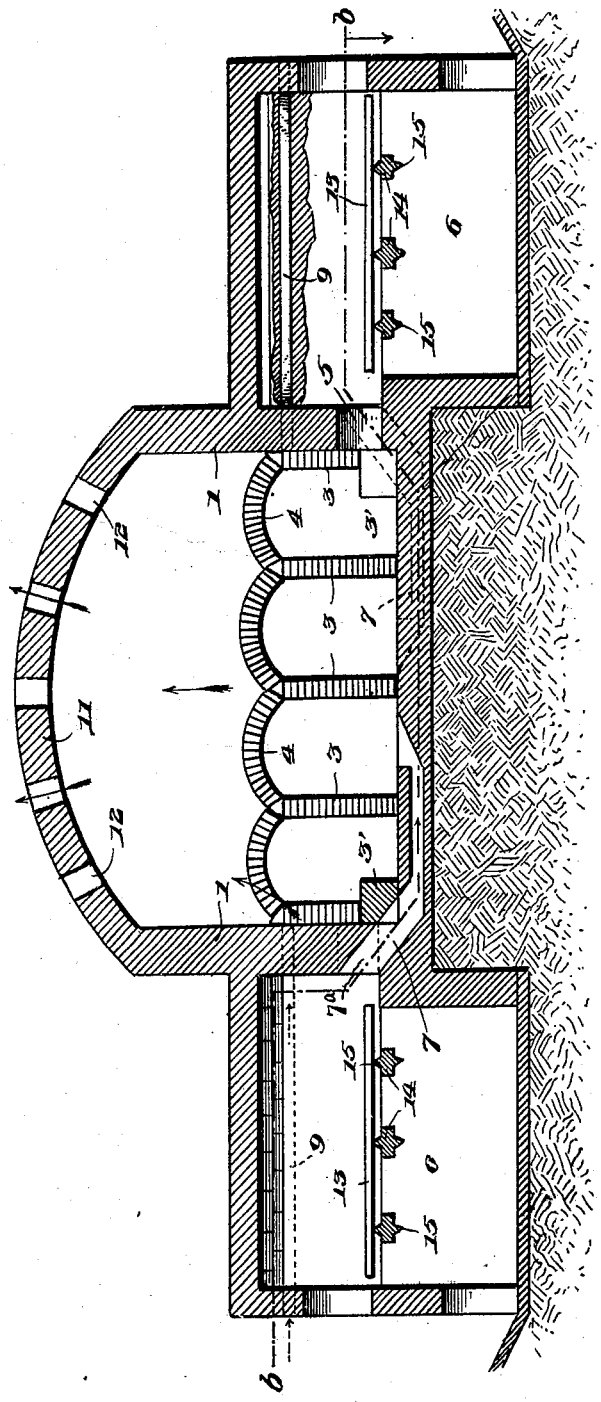

No. 682,829. Patented Sept. 17, 1901.
H. KONHORST.
BRICK KILN.
(Application filed Mar. 18, 1901.)
(No Model.) 2 Sheets—Sheet 1.

Witnesses H. Konhorst Inventor
by C. A. Snow & Co.
Attorneys

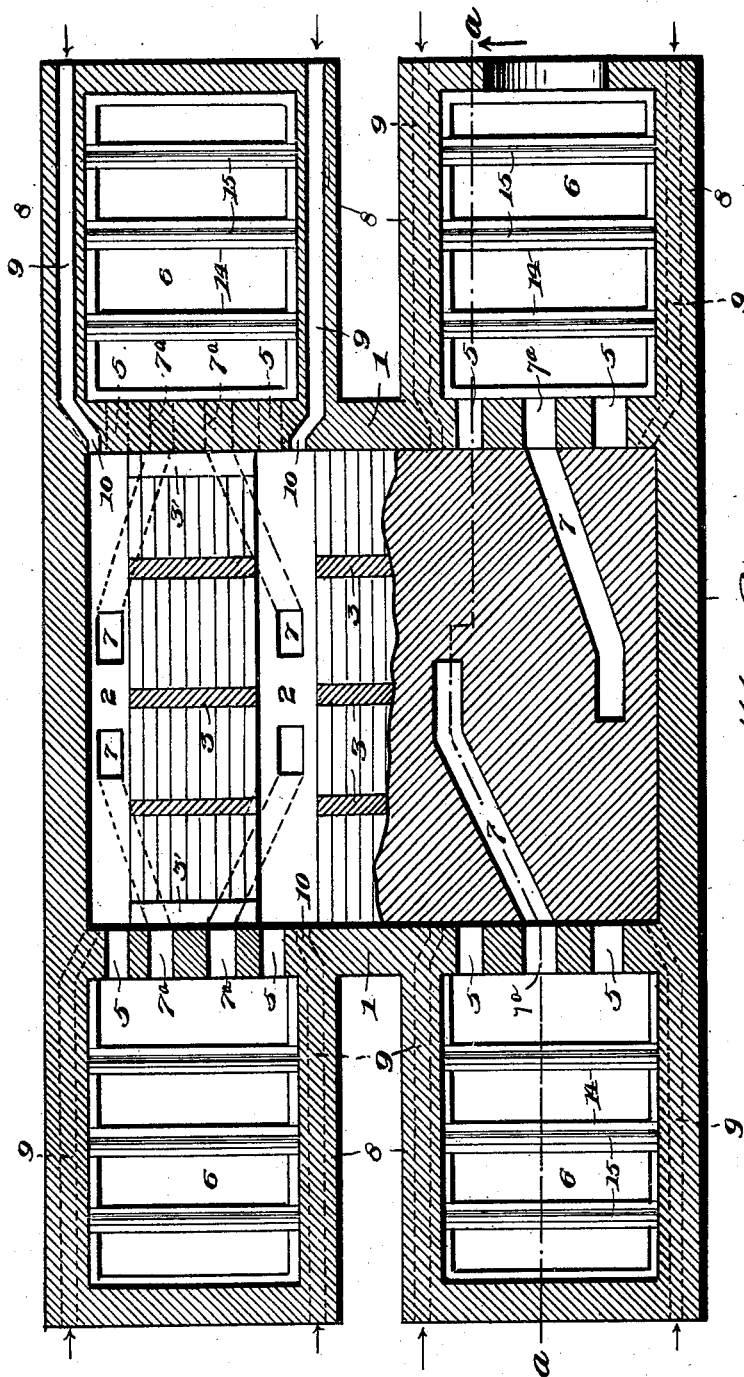

UNITED STATES PATENT OFFICE.

HENRY KONHORST, OF EVANSVILLE, INDIANA, ASSIGNOR OF ONE-HALF TO JOSEPH B. JOHNSTON, OF HENDERSON, KENTUCKY.

BRICK-KILN.

SPECIFICATION forming part of Letters Patent No. 682,829, dated September 17, 1901.

Application filed March 18, 1901. Serial No. 51,759. (No model.)

*To all whom it may concern:*

Be it known that I, HENRY KONHORST, a citizen of the United States, residing at Evansville, in the county of Vanderburg and State of Indiana, have invented a new and useful Brick-Kiln, of which the following is a specification.

My invention is an improved brick-kiln of that class in which the kiln is provided with permanent side walls and in which the furnaces are constructed against the outer sides of the side walls.

My invention consists in certain novel details of construction, arrangement, and operation of flues and devices therewith whereby several advantages are obtained, as will be hereinafter more particularly described.

In the accompanying drawings, Figure 1 is a vertical sectional view taken on a plane indicated by the line $a\,a$ of Fig. 2. Fig. 2 is a horizontal sectional view taken on a plane indicated by the line $b\,b$ of Fig. 1.

Between the side walls 1 of the kiln, at suitable regular distances apart, extend transversely-disposed open arches 2. Across the spaces between the arches 2 are disposed the benches 3, which are of open construction and are built up of green bricks with the usual interstices between them, whereby communication is established between the open arches 2. The said benches 3 support the arches 4, which are likewise constructed of green bricks. In the side walls 1 are openings or flues 5 immediately above the floor of the kiln, which flues are at the ends of the open arches 2 and establish communication between the furnaces 6 and the said open arches. The said flues 5 are near the sides of the furnaces. Intermediate of the flues 5 are openings 7ª, which form the throats of underground flues 7, the latter being obliquely disposed, as shown, and at their inner ends opening upward through the floor of the kiln into the open arches 2 at points near the centers thereof, the said underground flues serving to convey the heated air, flames, and products of combustion from the furnaces to the open arches 2, near the centers of the latter, while the flues 5 lead directly from the furnaces to the ends of said open arches, and thereby the latter are uniformly heated from the furnaces, as will be understood, and each flue may have one or more suitable dampers to control heat and draft. The lower portions of the side benches 3' are composed or constructed of suitable brick and are permanent structures, and the flues 7, which dip downward from the furnaces through the walls 1, as shown in Fig. 1, extend partly through the side walls 1 and partly through the permanent benches 3', as shown. It will be observed that the downwardly-inclined flues 7ª, which form the throats of the flues 7, are of greater dimensions than said flues 7, thereby promoting draft through the latter. In the side walls 8 of the furnaces 6, immediately under the arches of the said furnaces, are air-flues 9, which are constructed in the furnace-walls 8, and extend from the outer ends of the latter to the side walls 1 of the kiln, where they communicate with obliquely-disposed ports 10 in the said side walls, which ports 10 at their inner ends open into the ends of the open arches 2 at a suitable height above the floor of the kiln. Air is conveyed to the ends of the said open arches 2 through the said air-flues 9 and ports 10, and since the walls of the furnaces, together with those portions of the side walls 1 of the kiln which form the inner ends of the furnaces, become intensely heated the air as it passes through the said flues 9 is heated to a high degree before reaching the open arches 2. By thus providing means to supply heated air to the open arches of the kiln the draft in the kiln is actively promoted and the same becomes heated to the same degree throughout its entire extent, thus causing the bricks to be uniformly burned. The arched or flat roof 11 of the kiln is provided with suitable flues or openings through which the products of combustion escape, and said flues and openings are provided with one or more dampers to control and direct heat and air.

The longitudinally-disposed grate-bars 13 of the furnaces are supported intermediate of their ends by reversible bridge-bars 14. The latter are alike on their upper and lower sides and are provided on their upper and lower sides with centrally-disposed ribs 15, which extend longitudinally of the said bridge-bars and on which the grate-bars rest. The said ribs 15 strengthen the said bridge-bars, and when the latter, together with the grate-bars, sag at their centers, which they do after continued use, the said bridge-bars are reversed, thus counteracting the tendency to sag.

Where the kiln is of considerable size, two of the underground flues 7 lead from the inner end of each furnace, as indicated at the upper portion of Fig. 2; but where the kiln is small or of only moderate dimensions only one of such flues 7 will lead from the inner end of each furnace, as is indicated at the lower portion of Fig. 2.

Having thus described my invention, I claim—

1. A brick-kiln having the transversely-disposed open arches, benches of open construction connecting the said open arches, furnaces on opposite sides of the kiln, flues leading from the inner ends of said furnaces directly into the ends of said open arches and underground flues leading from said furnaces to said open arches at points near the centers of the latter, substantially as described.

2. A brick-kiln having furnaces on the outer sides of its side walls, the walls of said furnaces being provided with air-flues leading to the interior of said kiln, said air-flues being heated by but not opening directly into the interior of said furnaces, said kiln being provided with transversely-disposed open arches, benches of open construction between the said arches, having flues leading from the furnaces directly into the ends of said open arches and being further provided with underground flues leading from said furnaces to said open arches at points intermediate of the ends of the latter, substantially as described.

In testimony that I claim the foregoing as my own I have hereto affixed my signature in the presence of two witnesses.

HENRY KONHORST.

Witnesses:
WM. F. KOCH,
CHARLES MEYER.